United States Patent
Goralski, Jr. et al.

(10) Patent No.: US 7,673,445 B2
(45) Date of Patent: Mar. 9, 2010

(54) MECHANICAL APPARATUS HAVING A CATALYTIC $NO_x$ STORAGE AND CONVERSION DEVICE

(75) Inventors: Christian T. Goralski, Jr., St. Paul, MN (US); Joseph R. Theis, Rockwood, MI (US); Gopichandra Surnilla, West Bloomfield, MI (US); Justin Ura, Livonia, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1248 days.

(21) Appl. No.: 10/985,576

(22) Filed: Nov. 9, 2004

(65) Prior Publication Data

US 2006/0096276 A1  May 11, 2006

(51) Int. Cl.
*F01N 3/00* (2006.01)
(52) U.S. Cl. ............................... 60/286; 60/274; 60/295; 60/297
(58) Field of Classification Search .................. 60/274, 60/285, 286, 295, 297
See application file for complete search history.

(56) References Cited

U.S. PATENT DOCUMENTS

| 5,397,545 | A | 3/1995 | Balling et al. | |
|---|---|---|---|---|
| 5,525,307 | A | 6/1996 | Yasaki et al. | |
| 6,499,294 | B1 * | 12/2002 | Katoh et al. | 60/301 |
| 6,539,709 | B2 * | 4/2003 | Kubo et al. | 60/301 |
| 6,938,412 | B2 * | 9/2005 | Li et al. | 60/300 |
| 7,305,820 | B2 * | 12/2007 | Miyashita | 60/301 |
| 7,363,758 | B2 * | 4/2008 | Surnilla et al. | 60/285 |
| 2001/0003245 | A1 | 6/2001 | Yahagi | |
| 2003/0182932 | A1 | 10/2003 | Miura et al. | |
| 2006/0117736 | A1 * | 6/2006 | Twigg | 60/274 |
| 2006/0248874 | A1 * | 11/2006 | Goersmann et al. | 60/274 |
| 2007/0101704 | A1 * | 5/2007 | Goulette et al. | 60/295 |

FOREIGN PATENT DOCUMENTS

| EP | 573672 | 12/1993 |
|---|---|---|
| EP | 1048828 | 11/2000 |
| EP | 1273773 | 1/2003 |
| EP | 1426572 | 6/2004 |
| GB | 2342055 | 4/2000 |

\* cited by examiner

*Primary Examiner*—Tu M Nguyen
(74) *Attorney, Agent, or Firm*—Julia Voutyras; Alleman Hall McCoy Russell & Tuttle LLP (57) ABSTRACT

A mechanical apparatus including a combustion engine, a conduit for transporting an exhaust stream away from the engine, a first catalytic $NO_x$ storage and conversion region disposed along the conduit, and a second catalytic $NO_x$ storage and conversion region disposed along the conduit at a location downstream from the first catalytic $NO_x$ storage and conversion region is disclosed. Each of the first catalytic $NO_x$ storage and conversion region and the second catalytic $NO_x$ storage and conversion region includes at least one catalytic metal configured to convert $NO_x$ to $NO_2$ when the engine is supplied a lean air/fuel mixture, and at least one $NO_x$ adsorbing compound configured to adsorb $NO_2$ for storage when the engine is supplied a lean air/fuel mixture, and wherein the one of the first and the second catalytic $NO_x$ storage and conversion regions has a lower concentration of catalytic metal than the other of the first and second catalytic $NO_x$ storage and conversion regions.

7 Claims, 11 Drawing Sheets

FIG. 14 NOx conversion vs. temperature for different PGM loadings on 60/5 Test with 5% CO + 1.7% H2 during 5 second Purges. NOx Traps Aged 50 hrs at 650 C inlet behind TWC aging on transient cycle with 1040 C max bed temperature.

MECHANICAL APPARATUS HAVING A CATALYTIC $NO_x$ STORAGE AND CONVERSION DEVICE

CROSS REFERENCE TO RELATED APPLICATIONS

The present application is related to U.S. patent application Ser. No. 10/985,578, titled "LEAN BURN ENGINE CONTROL NOx PURGING BASED ON POSITIONAL LOADING OF OXIDANTS IN EMISSION CONTROL DEVICE," filed Nov. 9,2004.

The Present application is also related to U.S. patent application Ser. No. 10/904,414, titled "LEAN NOX TRAP WITH PGM ZONED AXIALLY", filed Nov. 9, 2004

BACKGROUND

Lean-burning engines, or engines that run on an air/fuel mixture with a stoichiometrically greater amount of air than fuel, can offer improved fuel economy relative to engines configured to run on stoichiometric air/fuel mixtures.

However, lean-burning engines also may pose various disadvantages. For example, burning a lean air/fuel mixture may decrease the reduction of nitrogen oxides (collectively referred to as "$NO_x$") in a conventional three-way catalytic converter.

Various mechanisms have been developed to reduce $NO_x$ emissions in lean-burning engines. One mechanism is a catalyst known as a $NO_x$ trap. The $NO_x$ trap is a catalytic device typically positioned downstream of a catalytic converter in an emissions system, and is configured to retain $NO_x$ when the engine is running a lean air/fuel mixture for eventual reduction and regeneration when the engine runs a more rich air/fuel mixture.

A typical $NO_x$ trap includes one or more precious metals, such as platinum, rhodium, and/or palladium, to convert $NO_x$ in an emissions stream to $NO_2$, and an alkali or alkaline metal oxide, such as barium or calcium oxides, to which $NO_2$ adsorbs as a nitrate when the engine is running a lean air/fuel mixture. The engine can then be configured to periodically run a richer air/fuel mixture. The nitrates decompose under these conditions, releasing the $NO_x$ which then reacts with the carbon monoxide, hydrogen gas and various hydrocarbons in the exhaust over the precious metal to form $N_2$, thus decreasing the $NO_x$ emissions and regenerating the trap.

The use of a $NO_x$ trap can substantially reduce $NO_x$ emissions from a lean-burning engine. However, during high load conditions, an engine is typically operated at a stoichiometric air/fuel mixture. Under such operating conditions, some hydrocarbons, CO and $NO_x$ may reach the $NO_x$ trap and be converted to $CO_2$, $H_2O$ and $N_2$ at the $NO_x$ trap precious metal sites. These conversions are exothermic processes that can age the $NO_x$ trap, thereby causing a reduction in $NO_x$ storage capacity.

The $NO_x$ storage and conversion performance of a $NO_x$ trap typically improves with increasing platinum loading at temperatures between 200 and 400° C., particularly after thermal aging. Above 400° C., the influence of the noble metal concentration decreases because the rate of $NO_x$ oxidation increases. At these higher temperatures, the $NO_x$ storage performance is limited more by the amount of $NO_x$ storage sites, which is a function of the volume of the trap. This encourages the use of large $NO_x$ trap volumes with high platinum levels in order to provide good $NO_x$ storage performance at both low and high temperatures. However, this may increase the cost of the emissions treatment system.

SUMMARY

A mechanical apparatus including a combustion engine, a conduit for transporting an exhaust stream away from the engine, a first catalytic $NO_x$ storage and conversion region disposed along the conduit, and a second catalytic $NO_x$ storage and conversion region disposed along the conduit at a location downstream from the first catalytic $NO_x$ storage and conversion region is disclosed. Each of the first catalytic $NO_x$ storage and conversion region and the second catalytic $NO_x$ storage and conversion region includes at least one catalytic metal configured to convert $NO_x$ to $NO_2$ when the engine is supplied a lean air/fuel mixture, and at least one $NO_x$ adsorbing compound configured to adsorb $NO_2$ for storage when the engine is supplied a lean air/fuel mixture, and one of the first and second catalytic $NO_x$ storage and conversion regions has a lower concentration of catalytic metal than the other first and second catalytic $NO_x$ storage and conversion region, and a controller for adjusting an engine operating parameter depending on NOx distribution between at least the first and second regions. The controller may be optionally removed.

DETAILED DESCRIPTION OF THE DEPICTED EMBODIMENTS

Figure 1:
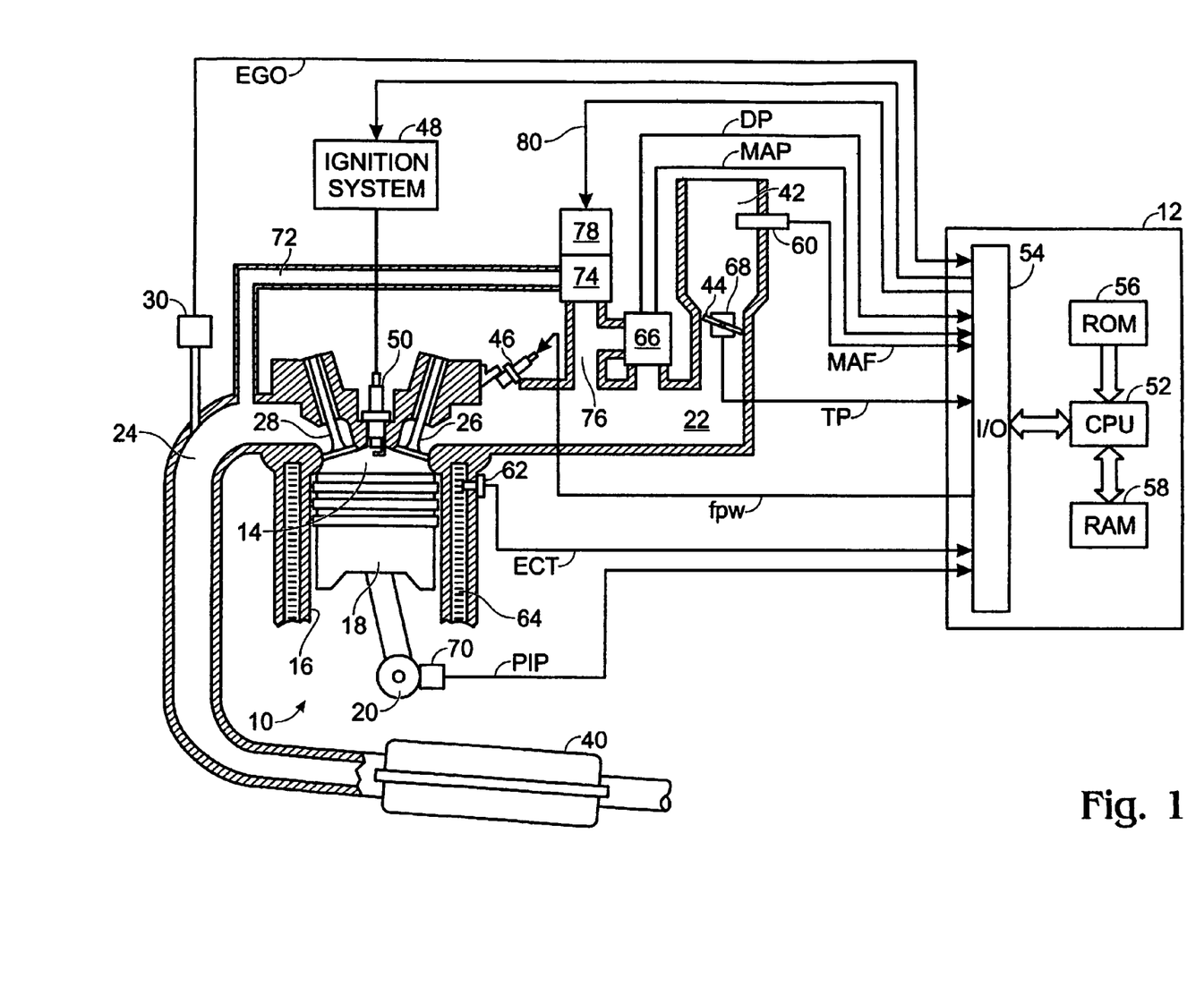
FIG. 1 is a schematic view of an embodiment of an internal combustion engine.

FIG. 1 shows a schematic depiction of an internal combustion engine 10. Engine 10 typically includes a plurality of cylinders, one of which is shown in FIG. 1, and is controlled by an electronic engine controller 12. Engine 10 includes a combustion chamber 14 and cylinder walls 16 with a piston 18 positioned therein and connected to a crankshaft 20. Combustion chamber 14 communicates with an intake manifold 22 and an exhaust manifold 24 via a respective intake valve 26 and exhaust valve 28. An exhaust gas oxygen sensor 30 is coupled to exhaust manifold 24 of engine 10, and an emissions treatment stage 40 is coupled to the exhaust manifold downstream of the exhaust gas oxygen sensor. The depicted engine may be configured for use in an automobile, for example, a passenger vehicle or a utility vehicle.

Intake manifold 22 communicates with a throttle body 42 via a throttle plate 44. Intake manifold 22 is also shown having a fuel injector 46 coupled thereto for delivering fuel in proportion to the pulse width of signal (fpw) from controller 12. Fuel is delivered to fuel injector 46 by a conventional fuel system (not shown) including a fuel tank, fuel pump, and fuel rail (not shown). Engine 10 further includes a conventional distributorless ignition system 48 to provide an ignition spark to combustion chamber 14 via a spark plug 50 in response to controller 12. In the embodiment described herein, controller 12 is a conventional microcomputer including: a microprocessor unit 52, input/output ports 54, an electronic memory chip 56, which is an electronically programmable memory in this particular example, a random access memory 58, and a conventional data bus.

Controller 12 receives various signals from sensors coupled to engine 10, in addition to those signals previously discussed, including: measurements of inducted mass air flow (MAF) from a mass air flow sensor 60 coupled to throttle body 42; engine coolant temperature (ECT) from a temperature sensor 62 coupled to cooling jacket 64; a measurement of manifold pressure (MAP) from a manifold absolute pressure sensor 66 coupled to intake manifold 22; a measurement of throttle position (TP) from a throttle position sensor 68 coupled to throttle plate 44; and a profile ignition pickup signal (PIP) from a Hall effect sensor 70 coupled to crankshaft 20 indicating an engine speed (N).

Exhaust gas is delivered to intake manifold 22 by a conventional EGR tube 72 communicating with exhaust manifold 24, EGR valve assembly 74, and EGR orifice 76. Alternatively, tube 72 could be an internally routed passage in the engine that communicates between exhaust manifold 24 and intake manifold 22.

Manifold absolute pressure sensor 66 communicates with EGR tube 72 between valve assembly 74 and orifice 76. Manifold absolute pressure sensor 66 also communicates with intake manifold 22. Stated another way, exhaust gas travels from exhaust manifold 24 first through EGR valve assembly 74, then through EGR orifice 76, to intake manifold 22. EGR valve assembly 74 can then be said to be located upstream of orifice 76.

Manifold absolute pressure sensor 66 provides a measurement of manifold pressure (MAP) and pressure drop across orifice 76 (DP) to controller 12. Signals MAP and DP are then used to calculate EGR flow. EGR valve assembly 74 has a valve position (not shown) for controlling a variable area restriction in EGR tube 72, which thereby controls EGR flow. EGR valve assembly 74 can either minimally restrict EGR flow through tube 72 or completely restrict EGR flow through tube 72. Vacuum regulator 78 is coupled to EGR valve assembly 74. Vacuum regulator 78 receives actuation signal on line 80 from controller 12 for controlling valve position of EGR valve assembly 74. In a preferred embodiment, EGR valve assembly 74 is a vacuum actuated valve. However, as is obvious to those skilled in the art, any type of flow control valve may be used, such as, for example, an electrical solenoid powered valve or a stepper motor powered valve. Note that alternative EGR systems can also be used, such as those having an orifice upstream of the EGR control valve. Further, systems utilizing a stepper motor valve without an orifice can also be used.

Figure 2:
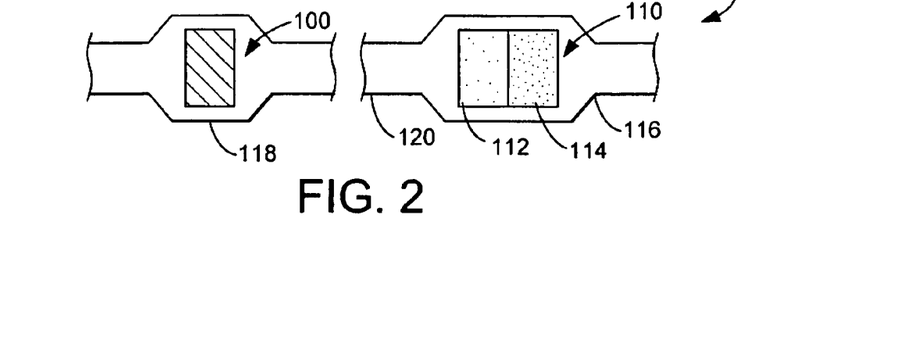
FIG. 2 is a schematic view of an embodiment of a $NO_x$ trap having a first catalytic $NO_x$ storage and conversion region and a second catalytic $NO_x$ storage and conversion region.

FIG. 2 shows a schematic view of an exemplary configuration of emissions treatment stage 40. Emissions treatment stage 40 includes a three-way catalytic converter 100, and a $NO_x$ trap 110 positioned downstream of catalytic converter 100. Emissions flow first through catalytic converter 100, and then through $NO_x$ trap 110. During rich and stoichiometric engine operation, hydrocarbons, CO and $NO_x$ compounds are converted to $CO_2$, $H_2O$ and $N_2$ by three-way catalyst 100, thereby separating these exothermic reactions from $NO_x$ trap 110 and helping to reduce the thermal aging of catalytic metals within the $NO_x$ trap 110. However, when engine 10 is running on a lean air/fuel mixture, insufficient reductants may be produced in the emission stream to cause the reduction of the $NO_x$ to $N_2$ in three-way catalytic converter 100. Therefore, $NO_x$ trap 110 includes a catalytic metal configured to convert $NO_x$ to $NO_2$, and a $NO_x$ adsorbent configured to adsorb the $NO_2$ as a nitrate. The $NO_x$ adsorbent is typically an alkali or alkaline earth metal oxide, but may be any other suitable compound. The $NO_x$ absorbent stores the excess $NO_x$ during lean conditions, and catalyzes the conversion of the stored $NO_x$ to $N_2$ during rich conditions, thereby regenerating $NO_x$ trap 110.

During periods of high engine loading when the engine is running a stoichiometric (or rich) air/fuel mixture, some hydrocarbons, CO and $NO_x$ may reach $NO_x$ trap 110. The conversions of these compounds to $CO_2$, $H_2O$ and $N_2$ by the precious metal sites in $NO_x$ trap 110 may cause the thermal aging of $NO_x$ trap 110. As described above, the exotherms from these processes tend to be greatest at the front of the $NO_x$ trap, and drop as concentrations of HC, CO and $NO_x$ in the emissions stream decrease along the length of the $NO_x$ trap. This tends to age the front of the $NO_x$ trap more than the back of the trap.

Prior solutions to loss of NOx storage capacity due to thermal aging have included using larger $NO_x$ traps, and/or using higher concentrations of catalytic metals in the $NO_x$ traps. However, such solutions may increase the cost of the traps. Prior solutions to help prevent thermal aging have also included placing a close-coupled catalytic converter in front of the $NO_x$ to perform the conversions of hydrocarbons, CO and $NO_x$ during rich and stoichiometric operations at a location upstream of and spaced from the $NO_x$ converter. However, the close-coupled catalysts used in conjunction with $NO_x$ traps with engines configured to run lean air/fuel mixtures are often small in volume. Therefore, some hydrocarbons, CO and $NO_x$ may still reach the $NO_x$ trap during heavy load conditions, and therefore still thermally age the $NO_x$ trap.

To help overcome these issues, $NO_x$ trap 110 includes a plurality of catalytic $NO_x$ storage and conversion regions having different concentrations of metal catalyst. In specific embodiments, catalytic $NO_x$ storage regions positioned in upstream locations along $NO_x$ trap 110 have lower concentrations of catalytic metal than catalytic $NO_x$ storage regions positioned in downstream locations in $NO_x$ trap 110. For example, in the embodiment of FIG. 2, $NO_x$ trap 110 includes a first catalytic $NO_x$ storage and conversion region 112 having a first, lower concentration of catalytic metal, and a second catalytic $NO_x$ storage and conversion region 114 having a second, greater concentration of catalytic metal, wherein the second catalytic $NO_x$ storage and conversion region is positioned downstream of the first catalytic $NO_x$ storage and conversion region.

The terms "upstream" and "downstream" as used herein refer to the direction of emissions flow through $NO_x$ trap 110; emissions flow through the "upstream" regions of $NO_x$ trap 110 before flowing through "downstream" regions of $NO_x$ trap 110. The terms "metal catalyst" or "catalytic metal" as used herein refer to the metal used to convert $NO_x$ to $NO_2$, rather than to the metal oxide used to store the $NO_x$ as a nitrate. Examples of suitable metal catalysts include, but are not limited to, platinum, palladium, rhodium, and combinations thereof.

As described in more detail below, it has been found that $NO_x$ traps having zones of different catalytic metal concentrations generally have higher $NO_x$ storage and conversion capacities than $NO_x$ traps of equal volume and total catalytic metal amounts having an essentially uniform concentration of catalytic metal dispersed within the trap. Furthermore, it has been found that $NO_x$ traps having a lower concentration of catalytic metal in an upstream region relative to a downstream region generally have both higher $NO_x$ storage and conversion capacities and higher resistance to loss of capacity by thermal aging. With this arrangement, the higher loaded zone, which helps to provide good $NO_x$ storage performance at low temperatures after the occurrence of some aging, is protected from most of the exothermic reactions during thermal aging processes caused by the conversion of hydrocarbons, CO and $NO_x$ at the catalytic metal sites in the $NO_x$ trap.

It should be mentioned that, as opposed to $NO_x$ traps, some known three-way catalyst systems have a staggered or zoned noble metal distribution. However, in these systems, the higher loaded section is typically the upstream section of the catalyst system, and is used to improve the lightoff performance of the system. Therefore, the arrangement of the noble metal in $NO_x$ trap 110, where the higher loaded section is in the rear, is unexpected and unique.

First catalytic $NO_x$ storage and conversion region 112 and second catalytic $NO_x$ storage and conversion region 114 may each have any suitable concentration of catalytic metal. For example, in some embodiments, first catalytic $NO_x$ storage and conversion region 112 may have a concentration of catalytic metal in the range of between approximately 10 and 60 grams/cubic foot (gpcf), and second catalytic $NO_x$ storage and conversion region 114 may have a concentration of catalytic metal in the range of between approximately 50 and 150 gpcf. In other embodiments, first catalytic $NO_x$ storage and conversion region 112 may have a concentration of catalytic metal in the range of between approximately 1.0 and 2.2 grams/liter, and second catalytic $NO_x$ storage and conversion region 114 may have a concentration of catalytic metal in the range of between approximately 1.8 and 5.2 grams/liter. In one specific embodiment, first catalytic $NO_x$ storage and conversion region has a concentration of catalytic metal of approximately 1.8 grams/liter, and second catalytic $NO_x$ storage and conversion region has a concentration of catalytic metal of approximately 4.8 grams/liter. It will be appreciated that these ranges are merely exemplary, and that first and second catalytic $NO_x$ storage and conversion regions 112 and 114 may also have concentrations of catalytic metal outside of these ranges.

First catalytic $NO_x$ storage and conversion region 112 and second catalytic $NO_x$ storage and conversion region 114 may have any suitable spatial relationship relative to each other and relative to the other components of engine 10. For example, first catalytic $NO_x$ storage and conversion region 112 and second catalytic $NO_x$ storage and conversion region 114 may be contained within a single housing 116, or may be contained within separate housings that are fluidically connected via a conduit (not shown) for containing the emissions stream. In some embodiments, first catalytic $NO_x$ storage and conversion region 112 and second catalytic $NO_x$ storage and conversion region 114 may be formed on a single support structure by loading different portions of the support structure with different concentrations of catalytic metal, while in other embodiments the first and second catalytic $NO_x$ storage and conversion regions may be formed on physically separate support structures. Likewise, three-way catalyst 100 may be contained within the same housing as $NO_x$ trap 110, or may be contained within a different housing 118, as depicted in FIG. 2, and connected to $NO_x$ trap 110 via a conduit 120.

First catalytic $NO_x$ storage and conversion region 112 and second catalytic $NO_x$ storage and conversion region 114 may have any suitable size and/or volume relative to each other. For example, where first catalytic $NO_x$ storage region 112 and second catalytic $NO_x$ storage region 114 are formed on a single support structure, each catalytic $NO_x$ storage and conversion region may occupy approximately ½ of the $NO_x$ trap volume, surface area, or other measurement of size and/or capacity. Alternatively, either the first or the second catalytic $NO_x$ storage and conversion region may occupy either less than or more than ½ of the $NO_x$ trap volume, surface area, or other measurement of size and/or capacity. For example, either the first or the second catalytic $NO_x$ storage and conversion region may occupy ½, ⅓, ¼, ⅕, ⅙, etc. of the $NO_x$ trap volume, surface area, etc., or values greater than, lesser than, and between these fractions. Where first catalytic $NO_x$ storage and conversion region 112 and second catalytic $NO_x$ storage and conversion region 114 are formed on separate support structures (not shown), the support structures may have similar or different sizes, volumes, surface areas, etc.

EXPERIMENTAL RESULTS

Figure 3:
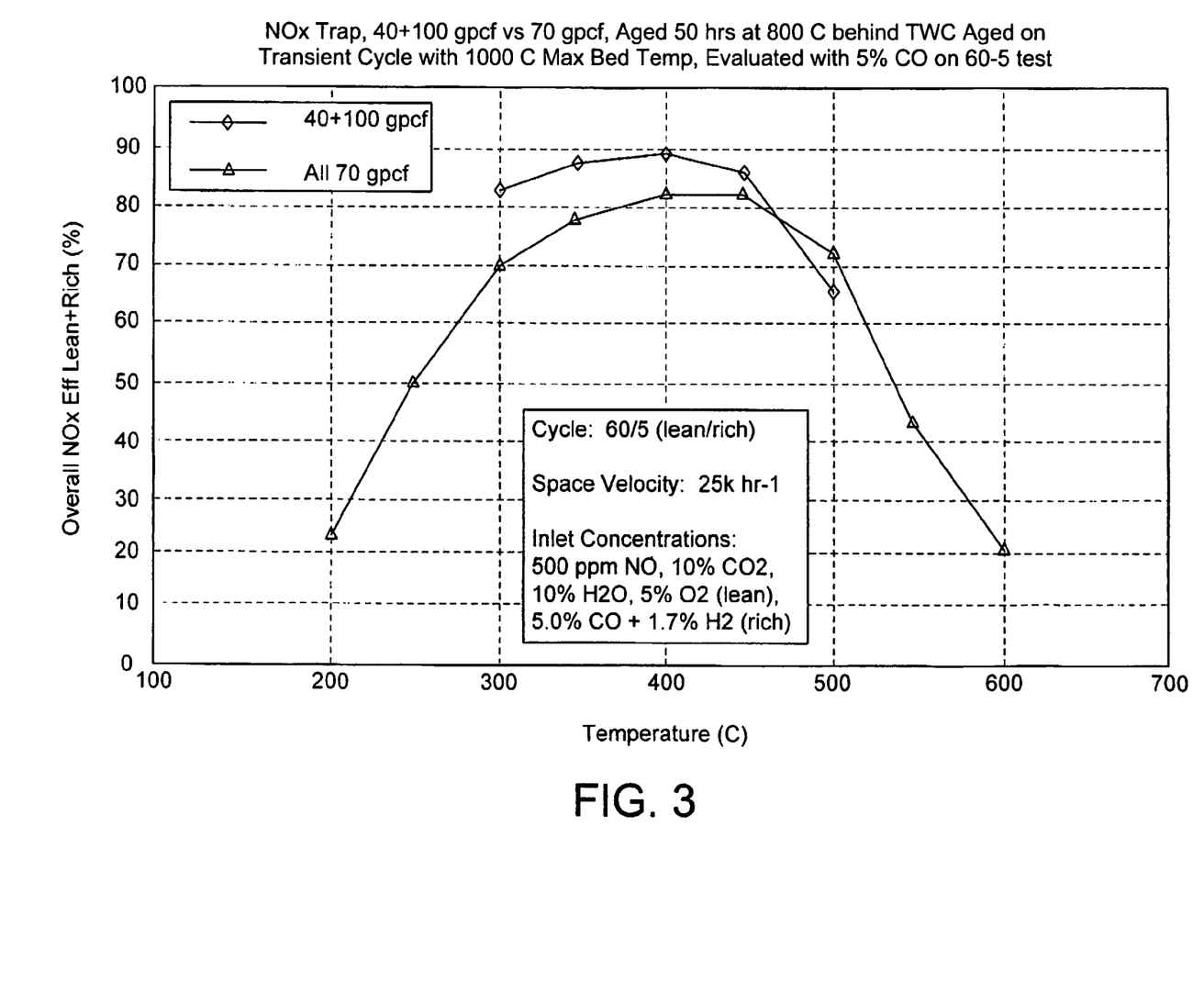
FIG. 3 is a graph showing $NO_x$ storage and conversion efficiencies at a constant space velocity of a $NO_x$ trap with a uniform concentration of noble metal and a $NO_x$ trap with a variable concentration of noble metal.

FIG. 3 is a graph showing the results of an experiment comparing the $NO_x$ storage and conversion efficiency of a one-inch core of a NOx trap uniformly loaded at 70 gpcf Pt/Rh with two half-inch cores of the same formulation where the front half is loaded at 40 gpcf Pt/Rh and the back half is loaded at 100 gpcf Pt/Rh ("the 40/100 system"). The measurements were made on a 60 second lean/5 second rich cycle. These tests were performed at a constant space velocity of 25000 $hr^{-1}$. Prior to testing, each $NO_x$ trap sample was aged for 50 hours at 800° C. inlet temperature on a pulse-flame combustion reactor behind a ½" three-way catalyst that was aging according to a predetermined routine with a maximum temperature of 1000° C. For the 40/100 system, 1" cores of 40 gpcf and 100 gpcf were aged separately, and then the front half of the 40 gpcf piece was tested in front of the back half of the 100 gpcf piece.

As shown in FIG. 3, the 40/100 system outperforms the uniformly loaded 70 gpcf loading at 400° C. and below, where the precious metal concentration has a significant influence on the $NO_x$ storage performance. However, in the range of approximately 450 to 500° C., where the noble metal concentration has less influence, the performance is similar between the two systems.

Figure 4:
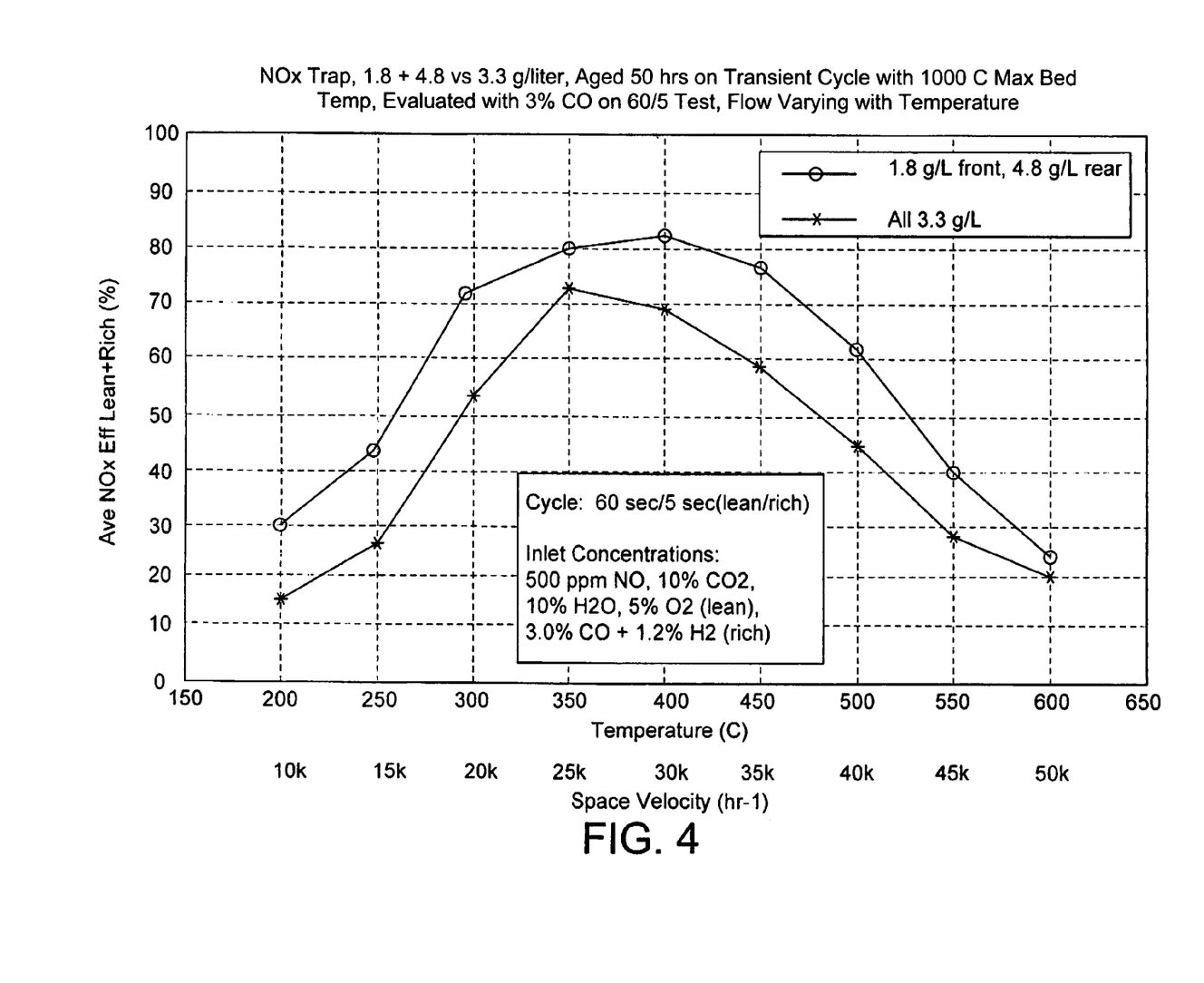
FIG. 4 is a graph showing $NO_x$ storage and conversion efficiencies at variable space velocity of a $NO_x$ trap with a uniform concentration of noble metal and a $NO_x$ trap with a variable concentration of noble metal.

As mentioned above, the tests in FIG. 3 were performed at a constant space velocity of 25000 hr$^{-1}$. However, on a vehicle, the flow rate of an emissions stream through NO$_x$ trap 110 normally increases as the temperature increases. Therefore, tests were run to determine the performance of NO$_x$ trap 110 with a flow rate that varies with temperature. Samples having 1.8 g/liter Pt/Rh, 4.8 g/liter Pt/Rh, and 3.3 g/liter Pt/Rh were aged for 50 hours on a predetermined routine with a maximum temperature of 1000° C. with no three-way catalyst in front during the aging. During measurements of the NO$_x$ conversion efficiencies of these samples, the flow was increased as the temperature increased, so that as the temperature increased from 200° C. to 600° C., the space velocity was increased linearly from 10,000 hr$^{-1}$ to 50,000 hr$^{-1}$. The front ½" of the 1.8 g/L sample was tested in front of the rear ½" of the 4.8 g/L sample and compared to the performance of the 1" sample with 3.3 g/L loading, which contained the same total amount of noble metal. FIG. 4 shows that the 1.8+4.8 g/L combination outperformed the uniform 3.3 g/L loading at all temperatures.

It has been found that the durability of the catalytic metal (i.e. its resistance to thermal aging) is improved when catalytic NO$_x$ storage and conversion region 114, with the higher catalytic metal concentration, is placed behind catalytic NO$_x$ storage and conversion region 112, with a lower catalytic metal concentration. With this arrangement, region 114, with the higher catalytic metal concentration that helps to provide good NO$_x$ storage performance at low temperatures after aging, is protected from most of the thermal aging caused by reactions of hydrocarbons, CO and NO$_x$ on the catalytic metal during periods of stoichiometric or rich operation.

Figure 5:
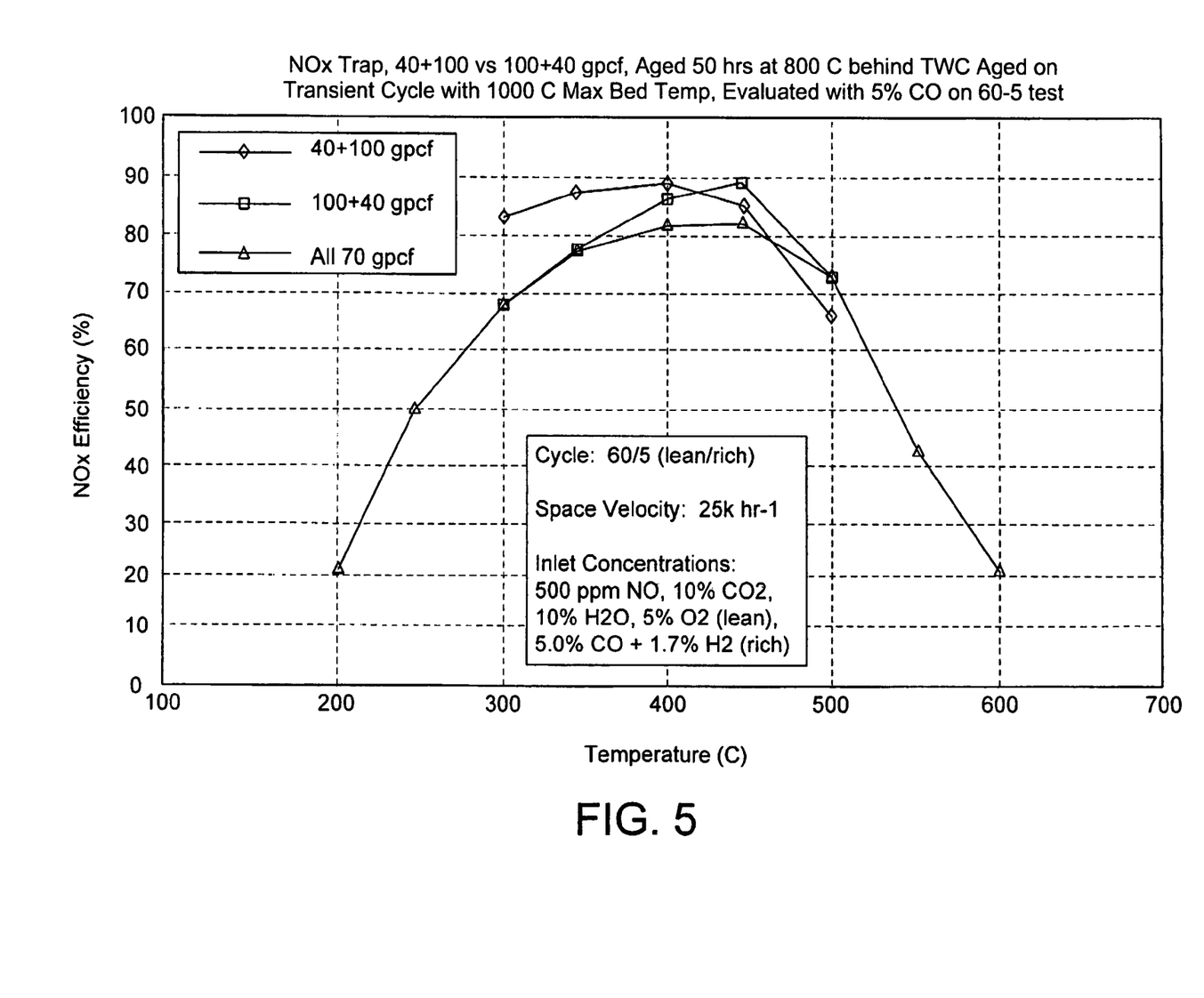
FIG. 5 is a graph showing $NO_x$ storage and conversion efficiencies at a constant space velocity of a $NO_x$ trap with a higher concentration of noble metal in the front than in the back of the trap and a $NO_x$ trap with a lower concentration of noble metal in the front than in the back of the trap and a NOx trap with constant loading in the front and back.

FIG. 5 compares the performance of the 40/100 system from FIG. 3 with a 100/40 system in which the upstream catalytic NO$_x$ storage and conversion region has a higher concentration of catalytic metal (100 gpcf) than the downstream catalytic NO$_x$ storage and conversion region (40 gpcf). The measurements were performed at a constant space velocity. As can be seen, the 40/100 system outperforms the 100/40 system at 300° C. and 350° C. This improvement at low temperatures may be attributed to better retention of low temperature performance from the 100 gpcf section when it is aged in the rear position. The 100/40 system performs about the same as the uniform 70 gpcf system at these temperatures, and this may be attributable to the fact that the 100 gpcf zone has been aged more in the front position.

Figure 6:
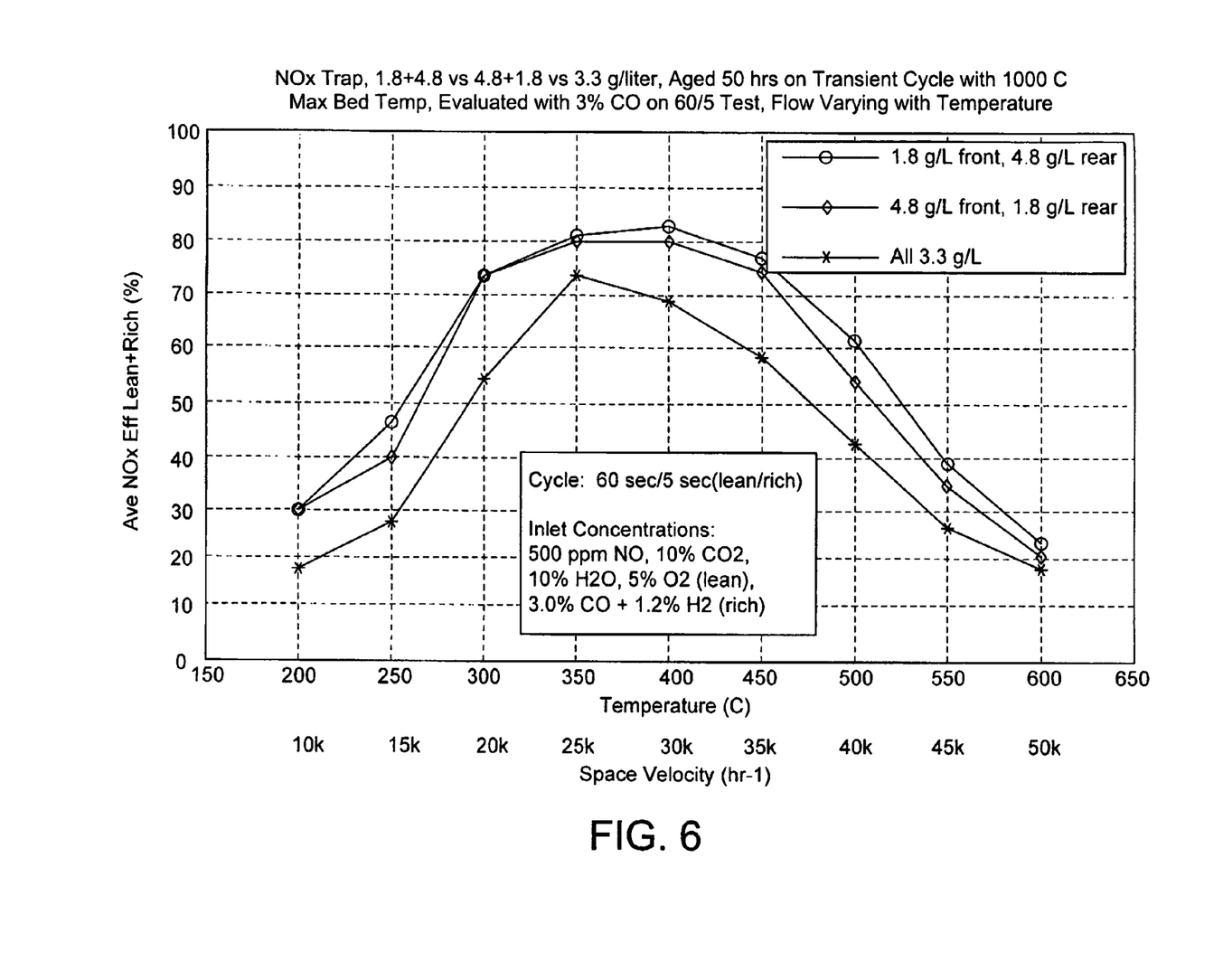
FIG. 6 is a graph showing $NO_x$ storage and conversion efficiencies at a variable space velocity of a $NO_x$ trap with a higher concentration of noble metal in the front than in the back of the trap and a $NO_x$ trap with a lower concentration of noble metal in the front than in the back of the trap and a $NO_x$ trap with constant loading in the front and back.

FIG. 6 compares the results of the 1.8+4.8 g/L system from FIG. 4 with a corresponding 4.8+1.8 g/L system (i.e. where the upstream catalytic NO$_x$ storage and conversion region has a catalytic metal concentration of 4.8 g/L, and the downstream catalytic NO$_x$ storage and conversion region has a catalytic metal concentration of 1.8 g/L). The measurements of FIG. 6 were taken with a linearly increasing space velocity. Again, the NO$_x$ trap with the higher concentration of catalytic metal in the downstream portion of the trap was shown to outperform the system with higher concentration of catalytic metal in the upstream portion of the trap. It should be noted that both the 1.8/4.8 and 4.8/1.8 NO$_x$ traps outperformed the uniformly loaded NO$_x$ trap.

Figure 7:
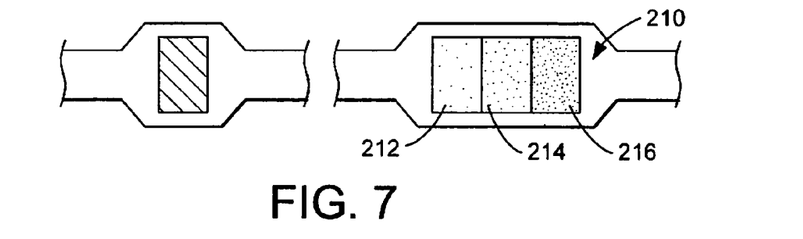
FIG. 7 is a schematic view of an embodiment of a $NO_x$ trap having first, second and third catalytic $NO_x$ storage and conversion regions.
Figure 8:
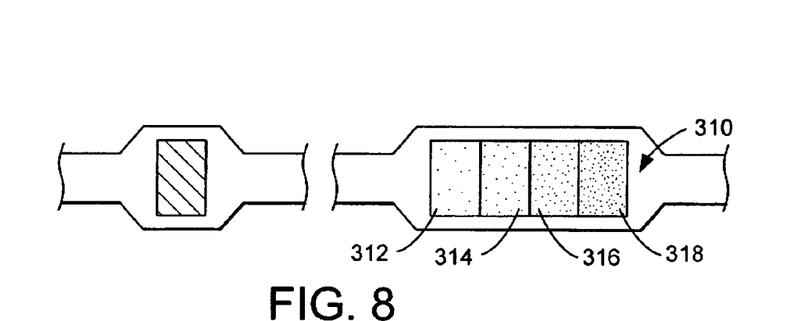
FIG. 8 is a schematic view of an embodiment of a $NO_x$ trap having first, second, third and fourth catalytic $NO_x$ storage and conversion regions.
Figure 9:
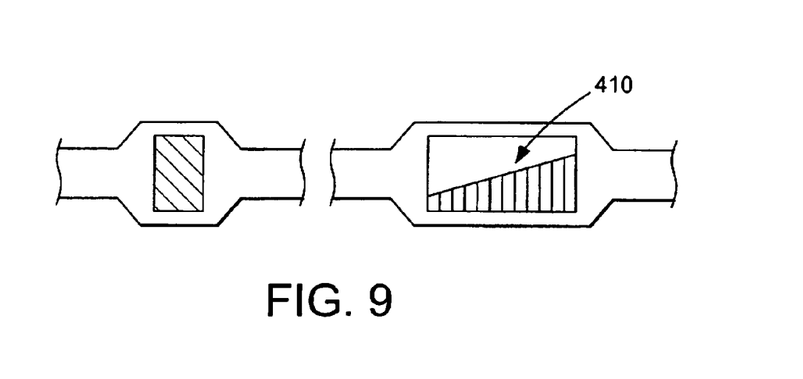
FIG. 9 is a schematic, graphical representation of an embodiment of a $NO_x$ trap having a continuously increasing catalytic metal concentration along its length.

While the NO$_x$ trap embodiment depicted in FIG. 2 includes two catalytic NO$_x$ storage and conversion regions, it will be appreciated that the concepts disclosed herein may be extended to NO$_x$ traps having more than two catalytic NO$_x$ storage and conversion regions with different catalytic metal concentrations. For example, FIG. 7 depicts, generally at 210, an exemplary NO$_x$ trap having three catalytic NO$_x$ storage and conversion regions 212, 214 and 216. Catalytic NO$_x$ storage and conversion region 212 has a lower catalytic metal concentration than catalytic NO$_x$ storage and conversion region 214, and region 214 has a lower catalytic metal concentration than region 216. Likewise, FIG. 8 depicts, generally at 310, an exemplary NO$_x$ trap having four catalytic NO$_x$ storage and conversion regions 312, 314, 316 and 318. Catalytic NO$_x$ storage and conversion region 312 has a lower catalytic metal concentration than region 314, which has a lower catalytic metal concentration than region 316, which in turn has a lower catalytic metal concentration than region 318. Furthermore, a NO$_x$ trap may have five, six, seven or more different catalytic metal regions if desired. Furthermore, rather than having discrete regions, the concentration of metal catalyst may increase in a continuous manner along the length of the NO$_x$ trap, as indicated graphically at 410 in FIG. 9. Furthermore, variations in catalytic metal concentrations not shown in FIGS. 2 and 7-9 may also be used. For example, the concentration of metal catalyst may increase in an exponential or logarithmic manner along the direction of emissions stream flow through the NO$_x$ trap, or may increase in any other non-linear manner.

While the embodiments of FIGS. 2 and 7-9 depict NO$_x$ traps having a lower concentration of catalytic metal in an upstream region of the trap and a higher concentration of catalytic metal in a downstream region of the trap, it will be appreciated that the upstream region may have a higher concentration of catalytic metal than the downstream region. While such a configuration may not be as resistant to thermal aging as the configuration in which the upstream region has a lower concentration of catalytic metal, the experimental results summarized in FIGS. 5 and 6 show that such a configuration may still offer better NO$_x$ storage and conversion performance than a NO$_x$ trap with uniform loading of catalytic metal.

Control System and Method

Furthermore, it will be appreciated that the reaction conditions disclosed herein are exemplary in nature, and that these specific embodiments are not to be considered in a limiting sense, because numerous variations are possible. The subject matter of the present disclosure includes all novel and non-obvious combinations and subcombinations of the various catalytic metal concentrations, zoning configurations, NO$_x$ trap designs, and other aspects related to NO$_x$ traps disclosed herein. The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the catalytic metal concentrations, zoning configurations, NO$_x$ trap designs, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Referring now to FIGS. 10-14, a system and method for improved control is described that takes into account axial loading of oxidants, such as NOx. In one particular example, the axial loading of NOx in the trap may be estimated during lean operation, and then the rate of excess reductants provided to the trap adjusted during rich purging operation.

As noted above, the air-fuel ratio of the exhaust gas during the purging operation (referred to as the purge air-fuel ratio) may be adjusted based on various parameters to attempt to lower the amount of unreacted NOx released from the tailpipe and the HC/CO emissions due to over-purging. These parameters may include temperature, time since purging began, exhaust mass flow rate and a total amount of NOx or oxidants stored in the trap. However, as described herein, simply relying on the total amount of stored constituents, such as NOx, may lead to improper reductant supply. This is described more fully with regard to FIG. 10.

Figure 10:
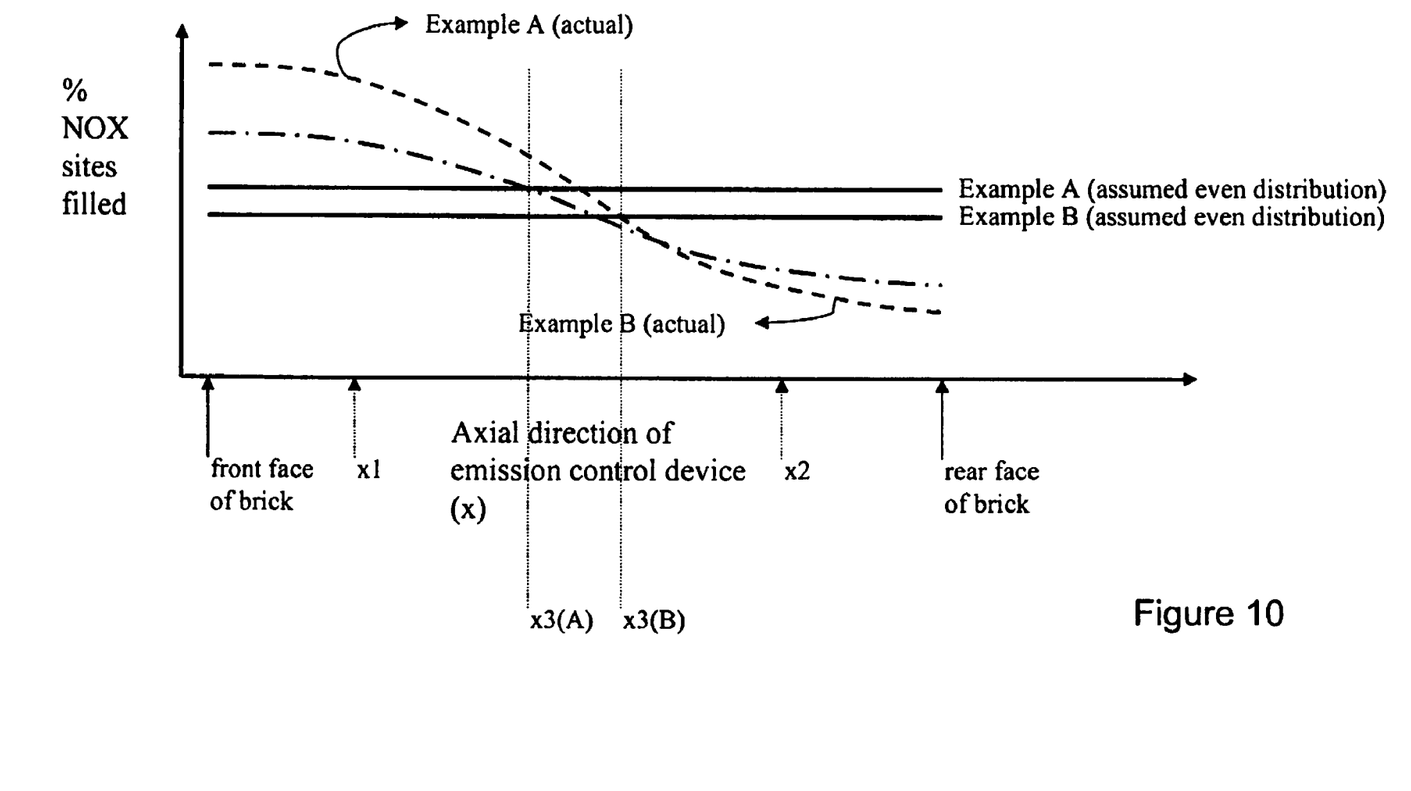
FIG. 10 is a graph showing variation of NOx storage over a device.

FIG. 10 shows two examples of how NOx may be distributed axially along a catalyst brick. Example A has a higher total amount of NOx stored for an assumed even distribution, while example B has a lower total amount of NOx stored (where both examples are shown for a common total number of available NOx sites).

During NOx purging, a reductant wave-front can be considered to move along the axial length of the emission control device as described in more detail below with regard to FIG. 11. For example, as reductant is supplied to the trap, the reductant first encounters NOx stored near the front face. Then, as more reductant is supplied, reductant gradually moves through the axial length of the catalyst, reacting with stored oxidants, until breakthrough occurs (at which time purging may be terminated). In this way, the reactions that occur in an upstream section of the catalyst affect the reactions (and the available reactants) in downstream sections of the catalyst, and so on from the front to rear of the catalyst.

Therefore, returning to FIG. 10, at any given position, e.g., x, if the amount of reductants supplied is based on an assumed even distribution, then either there may be too many reductants (x2) (or too great a flow rate, or too great a mass flow rate, etc.) or too few (x1). Only when the reductant wave-front is at the point where the even distribution assumption matches the amount stored (at x3) is the proper amount of reductant available.

Thus, while the total amount, or percent total amount, of stored oxidants may be a useful value in determining an appropriate amount of reductants, in one approach the axial loading of oxidants may also be used to adjust the air-fuel ratio (or flow rate of reductants) so that an improved profile may be obtained. In other words, by determining NOx storage distribution along a position of the catalyst (e.g., the axial length), it is possible to adjust the engine air-fuel (and/or airflow, fuel flow, etc.) based at least in part on the NOx storage distribution information (which may be measured, estimated, or combinations thereof).

Figure 11:
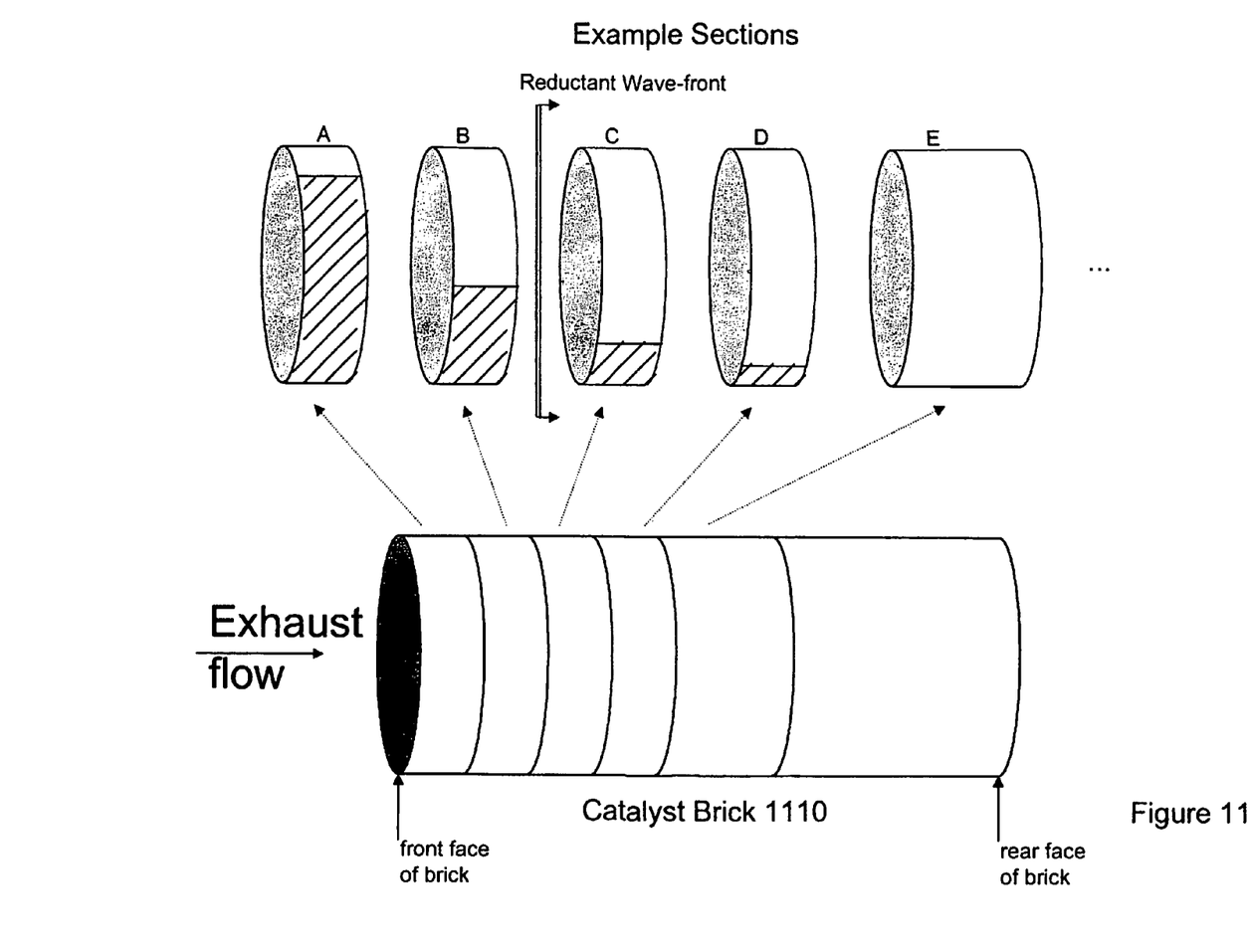
FIG. 11 shows example section of a catalyst brick.

Referring now to FIG. 11, it shows an example catalyst brick 1110 that may be divided (e.g., for estimation purposes, or physically divided, if desired) into a plurality of sections. In this example, several sample sections, A-E, are shown starting from the front face of the brick. While this example shows a single brick, it may equally apply to any number of bricks or emission control devices, or to a portion of a brick or emission control device.

The sections show conceptually the amount of oxidants (e.g., NOx plus Oxygen) stored at different locations/sections with a horizontal line (and angled fill shading). Also, the figure shows an example location of a reductant wave-front at an example position. This illustrates how, for the given location of the wave-front, the amount of reductants available for reaction with stored oxidants may be matched to the amount stored in the section it is about to confront (e.g., section C in this example). In other words, when the wave-front was passing through the previous section (Section B), the exhaust air-fuel ratio (and/or mass flow rate, or exhaust constituents) may be adjusted to have more reductants when passing through section B, then when the wave-front passes through section C. Also, when the wave-front reaches section D, even less reductant may be available. And, when the wave-front reaches section E, theoretically no reductants may be available.

Thus, the exhaust air-fuel ratio (and/or mass flow, or exhaust constituents) may be adjusted upstream (e.g., in the engine exhaust, or the exhaust upstream of brick 810) so that when the wave-front reaches section E, for example, the air-fuel ratio has returned to stoichiometry or lean, and the air-fuel ratio of the wave-front is stoichiometric or lean. Note also that the exhaust air-fuel ratio may be adjusted in advance of what the desired wave-front reductant amount is set to be due to transport delay, as well as any reactions that may occur upstream of the particular section. The desired air/fuel profile may be modified/corrected in a closed loop manner with feedback of air/fuel information from sensors located between or within the lean NOx trap bricks. Note that there are a variety of approaches for adjusting the amount and/or rate of reductants supplied to the device, including changing the air-fuel ratio, changing the exhaust mass flow, changing an amount of reductant injected into the exhaust, or others.

Such an approach, or any other described herein, may be applied to emission control devices or catalyst bricks in various positions and sizes, including devices in parallel or in series. In such a case, the estimate of axial loading and corresponding purge control may be performed on a per bank basis if there are multiple NOx traps in separate banks, for example.

Figure 12:
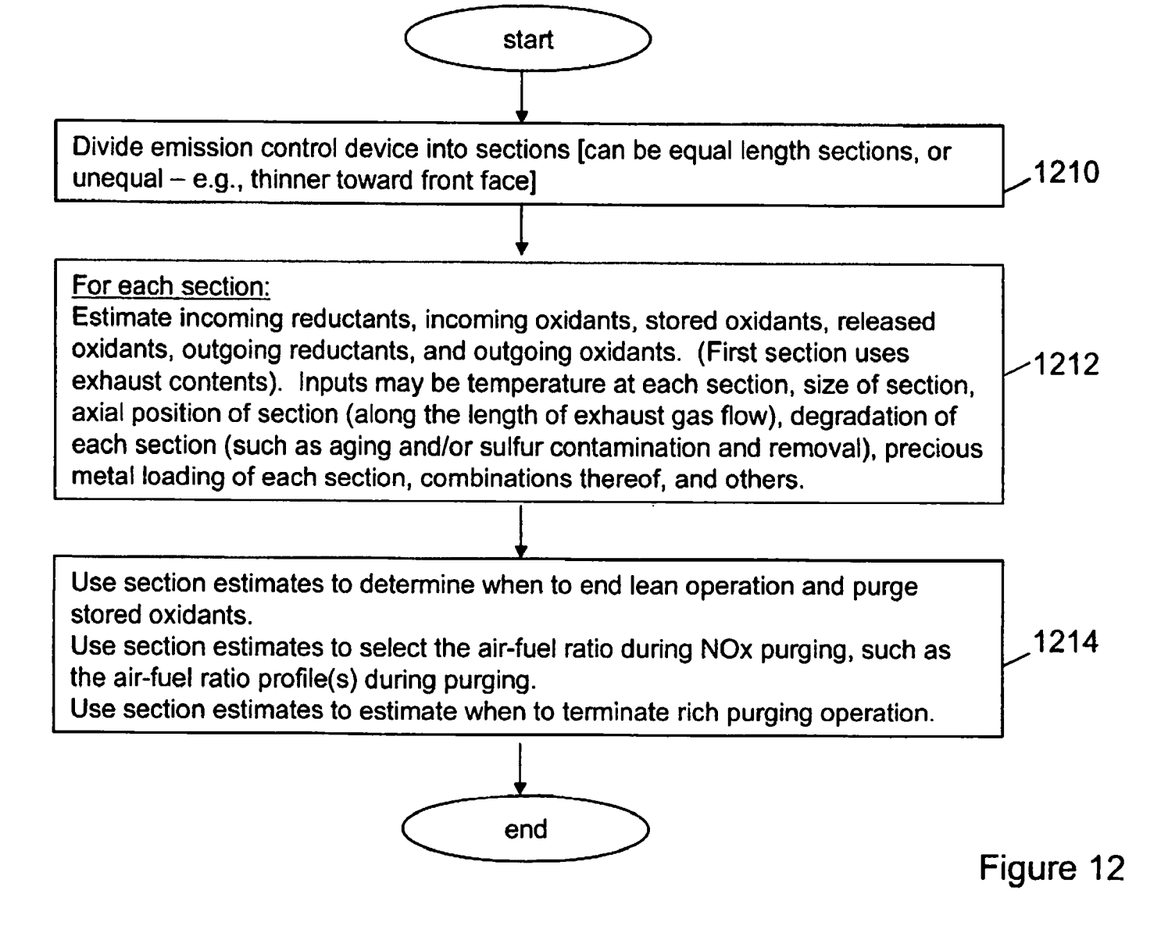
FIGS. 12-13 show example high level flow charts.

Referring now to FIG. 12, a flow chart is illustrated for performing the determination of axial NOx and/or oxygen distribution. In this particular example, a routine is described for estimating axial loading of NOx assuming even distribution of oxygen. However, it may be expanded to included axial distribution of oxygen, as well as other oxidants, if desired. The estimated parameters may then be made available on line during engine operation to be used to advantage in controlling operation, such as engine or exhaust air-fuel ratio during purging, as well as in determining device degradation, such as engine or catalyst degradation.

First, in step 1210, the routine divides the catalyst into sections for estimation purposes. The size of the sections may be constant, or vary along the length to provide higher resolution where more storage or reaction activity occurs, for example. Also, a fixed number and size of sections may also be used during all conditions, so that step 1210 may be skipped. In an alternative, the number and size of sections may vary based on other operating conditions, such as device temperature, time since engine start, catalyst degradation, and/or others.

Then, in step 1212, for each section, the routine estimates incoming reductants, incoming oxidants, stored oxidants, released oxidants, outgoing reductants, and/or outgoing oxidants. Note that for the most upstream section, the constituent estimates may be based on the exhaust gas contents, or engine out constituents. Inputs to this estimate may include: temperature at each section, size of section, axial position of section (along the length of exhaust gas flow), degradation of each section (such as aging and/or sulfur contamination and removal), precious metal loading of each section, combinations thereof, and others. Further, the estimate may take into account space velocity effects on storage/purging of oxidants, such as NOx.

Finally, in step 1214, the routine uses the section estimates for adjusting various engine and/or exhaust parameters. For example, the routine may use the section estimates to determine when to end lean operation and purge stored oxidants, select the air-fuel ratio during NOx purging, such as the air-fuel ratio profile(s) during purging, and/or to estimate when to terminate rich purging operation.

In one example, the estimation may include, for each section, determining the desired amount of incoming reductants so that when the actual reductants reach that section, the right amount of incoming reductants is available for the amount of NOx and oxygen stored at that location (as well as taking into account any effects on downstream sections, or tailpipe emissions). Then, this desired amount of incoming reductants can be used to determine the desired air-fuel ratio profile in the exhaust over time, as well as other parameters, such as desired exhaust temperature, desired exhaust mass flow rate, and others.

Figure 13:
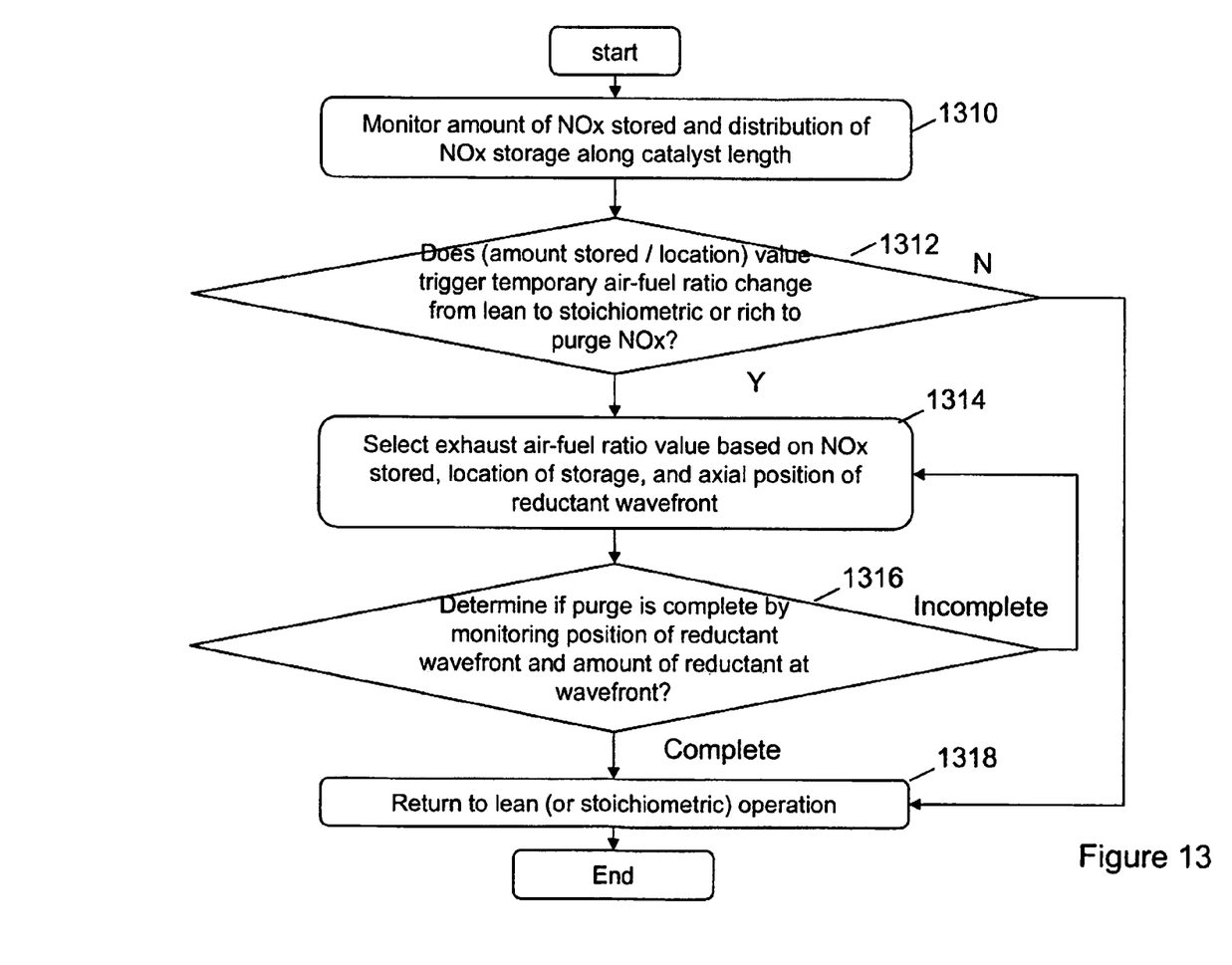

Referring now to FIG. 13, a routine is described for controlling engine operation based on axial information in the emission control device. Specifically, in step 1310, the routine, monitors an amount of NOx stored in the device, and a distribution of NOx storage along the catalyst length. For example, the estimation described above may be used. Further additional information from upstream and/or downstream exhaust sensors may also be used to monitor NOx storage amount and location along the catalyst length. For example, a NOx and/or oxygen sensor upstream, downstream, or in the emission control device can be used to improve any determinations of oxidant storage amounts and/or locations.

Then, in step 1312, the routine determines whether an amount stored/location value triggers a temporary air-fuel ratio change from lean to stoichiometric or rich to purge stored oxidants, such as NOx. For example, a weighted average of NOx stored at different axial positions may be used to trigger such operation. In an alternative embodiment, a downstream NOx sensor may be used to determine an amount of emissions per distance to trigger such operation.

Next, when the answer to step 1312 is Yes, the routine continues to step 1314. Alternatively, the routine continues to maintain or return to lean or stoichiometric operation. In step 1314, the routine selects a desired exhaust air-fuel ratio value based on NOx stored, location of storage, and/or axial position of the reductant wavefront, device temperature (or temperature profile along an axial length) or combinations thereof. The desired air/fuel profile may be modified/corrected in a closed loop manner with feedback of air/fuel information from sensors located between or within the lean NOx trap bricks. The desired exhaust air-fuel ratio may then be used to adjust engine operation (e.g., fuel injection, airflow amounts, etc.) to provide the desired air-fuel ratio.

Then, from step 1314, the routine continues to step 1316 to determine if the NOx purge is complete by monitoring position of reductant wavefront and an amount of reductant at the wavefront. This may be done using the above estimates, as well as information from exhaust sensors upstream, downstream, or in the emission control device. For example, if an oxygen sensor is located at a given axial position, it can detect movement of a reductant wavefront based on the measured oxygen concentration. In one example, when lack of oxygen is detected (beyond a threshold, for example), the position of the reductant wavefront may be determined.

If the purge is incomplete, the routine returns to step 1314. If it is complete, (e.g., the wavefront has reached a selected axial position with a given strength), the routine continues to step 1318 to return to lean (or stoichiometric) operation.

In this way, the routine may use the amount of NOx stored, and where it is stored, to control various aspects of engine and/or vehicle operation. For example, this information may be used to determine when to purge a catalyst, how long to purge a catalyst, and the level of richness and/or reductant mass flow rate of the exhaust used to purge a catalyst at different periods. Further, this information can be used to obtain improved estimates of catalyst degradation, as well, as to improve desulphurization control, temperature control, or others.

Several interactions between the method of operation and system configuration are now discussed in further detail. For example, two issues addressed in the control strategy of the present disclosure are the ability to take advantage of the zoning of the precious metal in the emission control device (e.g., the lean NOx trap), and the ability to take advantage of the potentially different temperature windows between the higher loaded and lower loaded zones.

As discussed above herein, because the loading (e.g., Pt loading) may be non-uniform along at least a portion of the length of a brick, the NOx storage capacity along the length of the brick may also not be uniform (where the number of sites may or may not be uniform, since capacity may also depend on the precious metal). Therefore, in one example, the estimation of the NOx trap behavior may explicitly divide the brick into at least two domains, one with a lower site density per unit volume and one with a higher site density per unit volume. Alternatively, the model may be broken into more than 2 zones to account for the differential aging that takes place along the length of the brick. For example, the front of the catalyst may deteriorate faster than the back of the catalyst.

Thus, one advantage to PGM zoning is that it allows for the increased capacity in an aged part as more sites are placed in the rear of the brick initially. The capacity of the trap as a function of position could be adjusted using an equation of the form:

$$Cap(z) = Cap0(z) * \exp(-k*t)$$

where Cap is the capacity as a function of the axial position z, Cap0 is the initial capacity as a function of the axial position z, t is the time, and k is an expression that captures the relative rate of deterioration as a function of temperature and/or air-fuel ratio exposure. The model can be adjusted to ensure that the sum of the capacity as a function of position equals the total capacity of the brick measured with sensors or by other methods. This may allow for accurate prediction of the amount of NOx stored on the brick as a function of time and position, which can then be used in the control strategy (e.g., such as determining the desired air-fuel ratio, desired catalyst temperature, etc.) to improve performance.

Note, however, that even if the NOx trap loading may vary axially, oxygen storage may still be evenly distributed across a particular catalyst (or it may be assumed to be so). In other words, for a particular brick (with a particular oxygen storage precious metal loading, it may be assumed that oxygen storage is evenly distributed across the brick, even though NOx storage varies axially. However, different bricks may have a different oxygen storage capacity, depending on the total loading in a given brick. Alternatively, variation in oxygen storage in different catalyst sections may also be included, where the oxygen storage capacity may increase with the PGM loading.

Another potential advantage of using a device with variable loading along the length is that the oxygen storage capacity of a more forward zone may be less than the oxygen storage capacity of a more rearward zone. Specifically, higher PGM loadings may catalyze the decomposition of the nitrates under lean conditions at higher temperatures. Therefore, during higher temperature operation, more $NO_x$ may be stored in the forward region than the rearward region. Since there is less oxygen storage capacity in the forward region due to the lower PGM, it may require less reductant to purge the forward region (since less reductant is being used to react with oxygen). In other words, compared to a situation where a higher PGM was in a more forward region (and more $NO_x$ stored in the rear)—which would require first purging the higher amount of oxygen in the more forward region first—less overall reductant may be need for a given amount of NOx purging. In this way, more efficient purging, and higher fuel economy, may be achieved.

Figure 14:
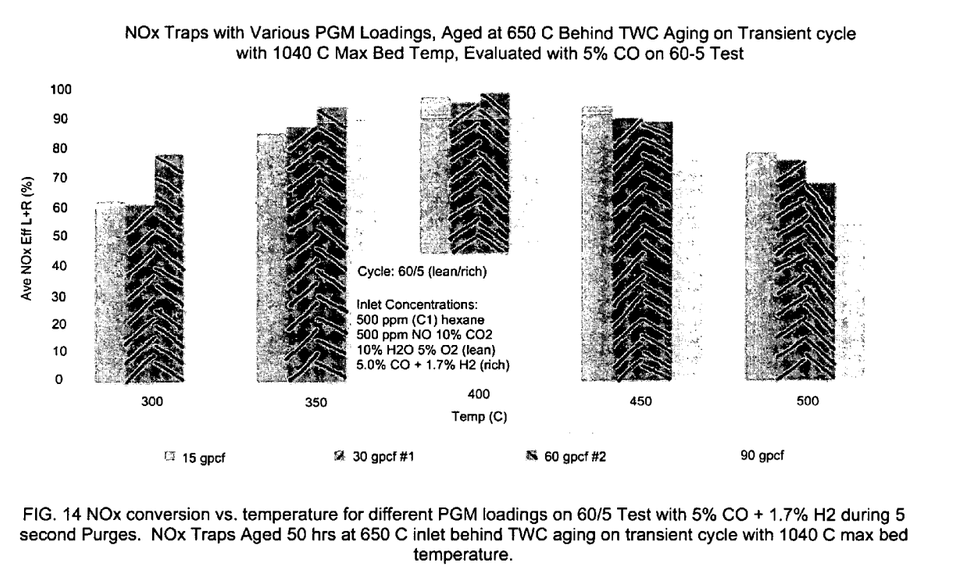
FIG. 14 shows example NOx efficiency for different catalyst loadings

A second control feature that may be used in the present disclosure can take advantage of the potentially different temperature windows between higher loaded and lower loaded zones. FIG. 14 shows the efficiency of 4 devices with 4 different PGM loadings in a standard laboratory test after aging. FIG. 14 shows that devices with higher PGM loading have better performance at lower temperatures, and traps with lower PGM loading have better performance at higher temperatures. Again, these effects and interactions may be included in the control and estimation approaches described above herein, where the emission control devices may be divided into discrete sections along an axial direction, thereby enabling the ability to account for any difference in performance, such as the temperature at which NOx may desorb from the catalyst (which may depend upon the local temperature, A/F, PGM loading, and amount of NOx stored). Since one or more of these factors may change as a function of position, a discrete model in the axial direction for the NOx trap may be used to advantage.

We claim:

1. In a mechanical apparatus having a combustion engine, a method of treating a stream of exhaust gases to remove $NO_x$ compounds from the stream of exhaust gases, the method comprising:

passing the stream of exhaust gases through a first catalytic region;

passing the stream of exhaust gases through a second catalytic region after passing the stream of exhaust gases through the first catalytic region, wherein each of the first catalytic region and the second catalytic region has a catalytic metal configured to convert $NO_x$ to $NO_2$ and a $NO_x$ adsorber configured to adsorb the $NO_2$, and wherein the first catalytic region has a lower concentration of the catalytic metal than the second catalytic region; and passing reductant through said first and second region, where an amount of reductant supplied to said first region varies from an amount of reductant supplied to said second region.

2. The method of claim 1, wherein passing the stream of exhaust gases through the first catalytic region and the second catalytic region includes passing the stream of exhaust gases through a single casing containing the first catalytic region and the second catalytic region.

3. The method of claim 1, wherein passing the stream of exhaust gases through the first catalytic region and the second catalytic region includes passing the stream of exhaust gases through first and second catalytic regions of approximately equal size.

4. The method of claim 1, wherein the catalytic metal includes at least one metal selected from the group consisting of platinum, palladium and rhodium.

5. The method of claim 1, further comprising passing the stream of exhaust gases through a three-way catalyst before passing the stream of exhaust gases through the first catalytic region.

6. The method of claim 1, wherein the first catalytic region includes a concentration of the catalytic metal of between approximately 1.0 and 2.2 grams/liter, and wherein the second catalytic region includes a concentration of the catalytic metal of between approximately 1.8 and 5.2 grams/liter.

7. The method of claim 6, wherein the first catalytic region includes a concentration of catalytic metal of approximately 1.8 grams/liter, and wherein the second catalytic region includes a concentration of catalytic metal of approximately 4.8 grams/liter.

* * * * *